United States Patent [19]

Kawajiri

[11] Patent Number: 4,617,976
[45] Date of Patent: Oct. 21, 1986

[54] TIRE FOR USE IN RUNNING ON SOFT GROUND AND EXCELLENT IN GROUND-CONTACTING PROPERTY

[75] Inventor: Junichi Kawajiri, Tokyo, Japan

[73] Assignee: Bridgestone Corporation, Tokyo, Japan

[21] Appl. No.: 622,335

[22] Filed: Jun. 19, 1984

[30] Foreign Application Priority Data

Sep. 20, 1983 [JP] Japan .................................. 58-172069

[51] Int. Cl.$^4$ ............................................. B60C 11/11
[52] U.S. Cl. ................................. 152/209 R; D12/140
[58] Field of Search ........... 152/209 R, 209 D, 209 B; D12/139, 140, 136, 138

[56] References Cited

U.S. PATENT DOCUMENTS 3,707,177  12/1972  Boileau ........................... 152/209 R

OTHER PUBLICATIONS

1978 Tread Design Guide, Bennett Sarfield Publication, Tire Guides, Inc, The Tire Information Center, Commack, N.Y., p. 228.

Primary Examiner—Michael Ball
Attorney, Agent, or Firm—Sughrue, Mion, Zinn, Macpeak & Seas

[57] ABSTRACT

Disclosed herein is a tire for use in running on the soft ground, which comprises a pair of sidewalks, a tread portion toroidally connected with both of the sidewalls and a carcass reinforcing the whole tire. The tread portion is provided with plural rows of projecting blocks or lugs in a circumferential direction of the tire, which are isolated from one another by traverse grooves, such that the total ground-contacting area of the blocks or lugs to the total area of the tread is in a range of 15 to 30%, and is characterized in that in the bottom of each of the traverse grooves is provided a recess having the maximum depth equal to 5–20% of the height of the adjacent block or lug for facilitating the flexural deformation of the tread.

1 Claim, 3 Drawing Figures

TIRE FOR USE IN RUNNING ON SOFT GROUND AND EXCELLENT IN GROUND-CONTACTING PROPERTY

BACKGROUND OF THE INVENTION (1) Field of the Invention

This invention relates to a tire for use in running on a soft ground, and more particularly, to an improvement on a tread profile having tread patterns composed of a group of blocks, which is applied to a motocross tire of a relatively large scale motorcycle.

(2) Description of the Prior Art

A tire running on the soft ground, for instance, a motocross tire, has conventionally been constituted such that the groove between the adjacent blocks is made wider, and the net ground-contacting area to the total tread area including the grooves is set as extremely low as 15–30% from the requirements for the mud throw-out property, the traction performance, etc.

Recently, in order to further enhance the penetrating force of the blocks into the relatively soft ground surface and improve the controllability of the traction, etc., there is a tendency for the blocks to be designed in a smaller size and a hard tread rubber is used for preventing the reduction in the rigidity of the blocks which may be caused thereby.

However, if the hardness of the tread rubber is increased, the required items are met, but on the other hand, rubber flow is difficult during the vulcanization step, and the rubber near the blocks, that is, the rubber layer under the inner surfaces of the blocks is sucked into block forming portions of the mold, so that the carcass layer at these portions is drawn to form a wave shape and accordingly the durability of a casing is decreased. Further, since the fluidity of the rubber at a portion between the blocks, that is, at the portion corresponding to the groove portions drops, the gauge of a skid base at the groove portions becomes conspicuously thicker for the gauge at the block positions. Consequently, the rigidity of the whole tread portion is increased, and particularly, the thickness of the groove bottom portions becomes increased. Thus, the flexural rigidity in running under load becomes higher and the ground-contacting area becomes smaller. Thereby, not only steering performance such as the traction controllability, etc. are deteriorated, but also the weight of the whole tire is unfavorably increased, while the tire-manufacturing cost is raised.

SUMMARY OF THE INVENTION

It is, therefore, an object of the invention to eliminate the above drawbacks encountered by the tires of the prior art, and to provide a low cost tire for use in running on a soft ground in which the profile of a tread, that is, the profile of groove bottom portions, is particularized to eliminate the above-mentioned drawbacks of the conventional tires for use in running on the soft ground and to improve the rubber flow during the vulcanization and secure a relatively uniform gauge of a skid base, thereby improving the durability of a tire casing and the ground-contacting property.

According to the invention, there is the provision of a tire for use in running on the soft ground, which comprises a pair of sidewalls, a tread portion toroidally connected with both of the sidewalls and a carcass reinforcing the whole tire, said tread portion being provide with a plurality of rows of projecting blocks or lugs in a circumferential direction of the tire, which are isolated from one another by traverse grooves, such that the total ground-contacting area of the blocks or lugs to the total area of the tread is in a range of 15 to 30%, and is characterized in that in the bottom of each of the traverse grooves is, provided a recess having the maximum depth equal to 5–20% of the height of the adjacent block or lug for facilitating the flexural deformation of the tread.

BRIEF DESCRIPTION OF THE DRAWING

The invention will be described in a greater detail below in connection with the attached drawing, wherein.

DETAILED DESCRIPTION OF THE PREFERRED EMBODIMENT

A tire according to the invention comprises a pair of sidewalls 3, 3 and a tread 2 toroidally connected with both the sidewalls, and is entirely reinforced by a carcass. The illustrated tire 1 is a motocross tire as one embodiment according to the invention, and is reinforced by two carcass plies 4, but this is not restrictive in the invention. As the carcass, there may ordinarily be used at least one ply made of a layer of organic fiber cords of such as nylon, polyester rayon or the like. The direction in which the cords in the cord layer are arranged with respect to the equatorial direction of the tire may be 70° to 90° (radial or semi-radial arrangement) or 25°–45° (bias arrangement). Further, the cord layer is in a toroidal form extending between both bead portions, and reinforces the entire tread portion and the sidewall portions as mentioned above.

For the tread, that is, at the tread formed on the crown portion of the carcass, are projecting plural blocks or lugs in a circumferential direction which are isolated from one another by traverse grooves, respectively. The total ground-contacting surface area of the blocks or lugs is set at a range of 15–30% of the total surface area of the tread.

One of typical examples of the treads provided with plural rows of the projecting blocks in the circumferential direction is a tread adapted for the motocross tire, while one of the typical examples of the treads in which the lugs are similarly projectingly provided is a tread used for an agricultural tire. The illustrated tire 1 is an example of the motocross tire.

Figure 1:
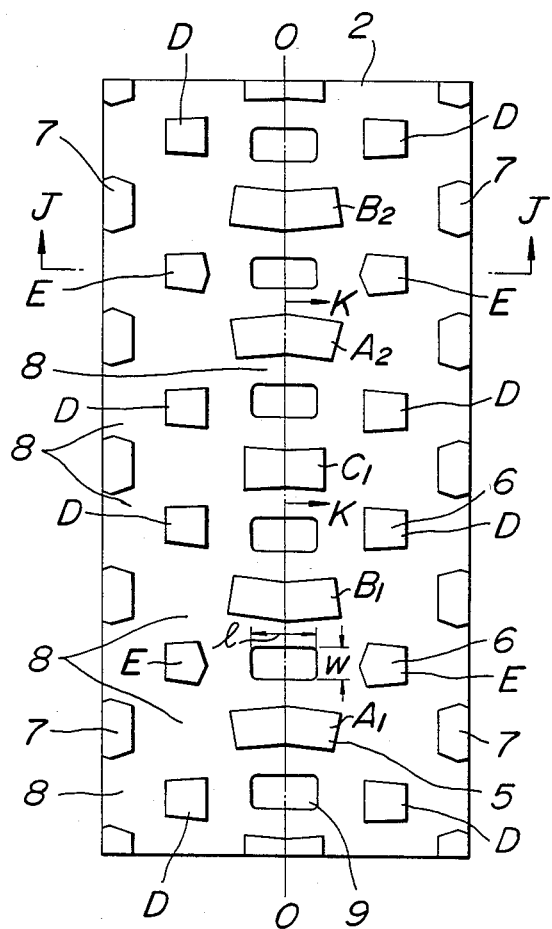
FIG. 1 is a view of a tire according to the present invention illustrating tread patterns thereof.

As shown in FIG. 1, the tire is provided with a row of central blocks 5 comprising three kinds of blocks, A, B, C, of different profiles, rows of shoulder blocks 7, 7 and rows of intermediate blocks 6, 6 each provided between the central and shoulder blocks, and comprising two kinds of blocks D, E, of different profiles. Traverse grooves 8 are formed between $A_1$ and $B_1$, between $B_1$ and $C_1$, between $C_1$ and $A_2$, ... in the central blocks 5, between D and E in the intermediate blocks 6, and between the adjacent shoulder blocks. In the tire of FIG. 1, for instance, the traverse groove between the $A_1$ and $B_1$ in the central blocks 5 serves as a longitudinal groove between E and E of the intermediate blocks on both the sides, while the traverse groove between D and E in the intermediate blocks 6 serves as a longitudinal groove between the central block and the opposed shoulder block 7. The block arrangement shown in FIG. 1 is merely an example according to the invention, but is not interpreted as a limitation of the invention. For instance, the block arrangement may be such that, for instance, the shoulder blocks 7, 7 on both sides, the intermediate blocks E, E and the central blocks $A_1$ are projecting aligned in a straight line orthogonal to the equatorial direction, or the block may be arranged in other various ways, for instance, in an intermediate pattern between the just above block arrangement and the arrangement in FIG. 1.

As the tread rubber including the above blocks or lugs, there may be used a rubber having a Shore A hardness of 65°–85° and a 300% modulus of elasticity in a range of 80 kg/cm$^2$–300 kg/cm$^2$ which rubber is extremely high in terms of both the rubber hardness and the modulus of elasticity as compared with the ordinary tread rubber, while the blocks or lugs are designed so small that the total ground-contacting area of the blocks or lugs to the total tread area is set at a range of 15–30%.

Further, according to the tire of the invention, a recess having the maximum depth equal to 5–20% of the height of the adjacent block or lug is provided in the bottom of each traverse groove between the blocks or lugs. This is one of the main features of the invention, by which the rubber flow is improved during vulcanization to make the gauge t of skid base relatively uniform, so that the flexural deformation of the tread can be facilitated.

Figure 2:
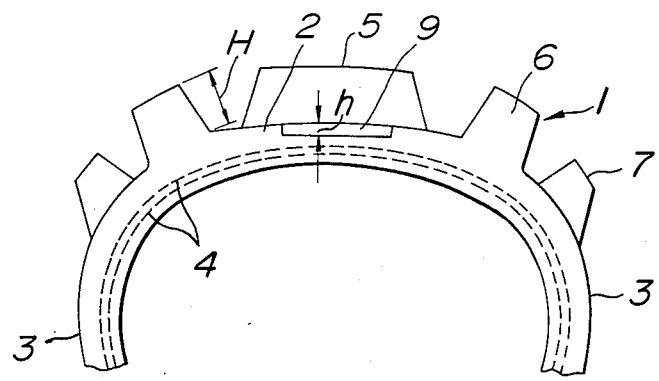
FIG. 2 is a sectional view along a line J—J in FIG. 1.
Figure 3:
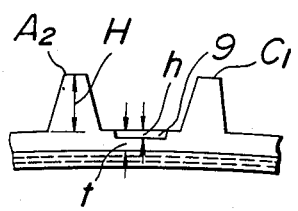
FIG. 3 is a sectional view along the line K—K in FIG. 1.

In the illustrated embodiment, each recess is provided at the middle position between each pair of the central blocks 5. The maximum depth h of the recess as shown in FIGS. 2 and 3 is 5–20%, and preferably 7–15% of the height H of the adjacent block or lug. If the depth is less than 5% H, there is obtained no effect due to the provision of the recesses. On the other hand, if it exceeds 20%, the amount of the tread rubber thereat becomes smaller, that is, as shown in FIG. 3, the gauge t of the skid base approaches the depth h so that the recess bottom can not be reinforced by the base rubber. The depth of the recess is not necessarily uniform, and the recess is shaped to have a gradually deeper profile toward the center thereof. The width w of the recess depends upon the hardness and the modulus of elasticity of the tread rubber used, and the maximum possible width thereof is the width of the base portion of the adjacent block. The width of the recess is oppositely determined to be not wider than this maximum width over the central portion between the adjacent two blocks as shown in FIG. 1, depending upon the kind and the material of tires. In particular, the width of the recess is preferably 40–70%. The length l of the recess is preferably not shorter than about one-half of the length of the adjacent block.

As shown in FIG. 1, it is preferable to locate the recess at at least the traverse grooves in the central block row. Further, depending upon the block arrangement, for instance, as mentioned above, when the blocks are aligned between both the tread edges and in the lines orthogonal to the equatorial direction, and the traverse grooves are linearly connected with one another, the recess may be provided to traverse the tread in a width direction thereof. If necessary, there may be provided recesses in the bottom of longitudinal grooves. Beside the rectangular shape in section as shown in FIG. 1, the profile of the recess may be selectively determined as a factor of the tread design, for example, in an ellipse form, etc.

The following example is given in illustration of the invention, but is not interpreted as limitations thereof.

EXAMPLE & COMPARATIVE EXAMPLE

A tire of a tire size of 120/90-18 comprising a tread rubber composed of a rubber of a Shore A hardness 77° and a 300% modulus of elasticity 200 kg/cm$^2$, and sidewall portions made of an ordinarily used soft rubber, which had the tread patterns as shown in FIG. 1 and recesses of the following dimensions provided in all traverse grooves in the central block row respectively, and was reinforced by four carcass plies (bias structure) of nylon cords, and a comparison tire similar to the above but having no recess were prepared.

With respect to each tire, the weight and a standard internal pressure, the ground-contacting area under load were measured, and results obtained were shown by index on the basis that the comparative tire is taken as "100".

| Recess: | width (w) | 14 mm |
|---|---|---|
| | length (l) | 30 mm |
| | depth (h) | 1.5 mm |
| | depth (h)/block height (H) = 0.09 | |

As mentioned above, the recesses were arranged in all the traverse grooves in the central block row, the width of the traverse grooves (at the base position of the block) being 45 mm, the length of the blocks A, B and C (at the base portion) corresponding to the recess length l being 50 mm, 50 mm and 40 mm, respectively.

| | Comparative tire | Invention tire |
|---|---|---|
| Skid base gauge (t) | 100 | 85 |
| Weight | 100 | 95 |
| Ground contacting area | 100 | 100 |

Note: The ground-contacting area was measured at an internal pressure of 1.0 kg/cm$^2$ under a load of 150 kg.

In the above results, the reason why the gauge t of the skid base of the tire according to the invention is extremely smaller (−15) than that of the comparative tire is due to the fact that when the green tire is placed into the mold and is pressurized from the internal surface of the tire toward the mold during the vulcanization, the projection zones of the mold corresponding to the recesses first begin to pressurize these recesses of the whole tread rubber, so that the rubber at those portions is fluidized and the rubber fluidization is locally promoted.

As mentioned above, according to the invention, since the recesses having the maximum depth equal to 5–20% of the height of the adjacent blocks or lugs are provided at the traverse grooves of the conventional type tire for use in running on the soft ground, the rubber flowing property during the vulcanization is improved to make the gauge of the skid base relatively uniform, while the flexural deformation of the tread is made easier, and the casing durability and the ground-contacting property are improved. Further, since the smaller amount of the rubber is needed as compared with the conventional tire, a cheaper manufacturing is favorably possible.

What is claimed is:

1. A tire for use in running on the soft ground, comprising; a pair of sidewalls, a tread portion toroidally connected with both of the sidewalls and a carcass reinforcing the entire tire, said tread portion being provided with a plurality of rows of projecting blocks consisting of a hard tread rubber, which are isolated from one another by wide traverse grooves and longitudinal grooves, such that the total ground-contacting area of the blocks or lugs to the total area of the tread is in a range of 15 to 30%, said blocks composed of a central block row in the central portion of the tread, a pair of shoulder block rows in the shoulder portions of the tread and a pair of intermediate block rows between said central and said shoulder block rows each extending in the longitudinal direction of the tire, wherein the intermediate blocks are located so that the traverse grooves between central blocks serve as longitudinal grooves between said intermediate blocks, and the bottoms of traverse grooves in the central block row being provided recess-like dimples having a width (w) of 40 to 70% of the width of the longitudinally adjacent block a length (l) of said recess-like dimples being not shorter than one-half of the length of the traverse adjacent block for facilitating the flexural deformation of the tread and a maximum depth of said recess-like dimples is 7 to 15% of the height of the adjacent block, and wherein the rubber of the tread including the blocks is made of a rubber of Shore A hardness of 65°–85° and a 300% modulus of elasticity of 80 kg/cm$^2$–300 kg/cm$^2$.

* * * * *